Aug. 25, 1964     J. J. WILTING     3,146,406

TRANSISTOR VOLTAGE CONVERTER

Filed June 17, 1960

INVENTOR
Johannes J. Wilting.
BY
AGENT 3,146,406
TRANSISTOR VOLTAGE CONVERTER
Johannes Jacobus Wilting, Eindhoven, Netherlands, assignor to North American Philips Company, Inc., New York, N.Y., a corporation of Delaware
Filed June 17, 1960, Ser. No. 36,989
Claims priority, application Germany July 4, 1959
9 Claims. (Cl. 331—113)

This invention relates to self-excited transistor voltage converters of the type having an under-critically damped load circuit which determines the operating frequency. Such converters have already been suggested in the prior patent application Serial No. 829,273, filed July 24, 1959, now U. S. Patent No. 3,008,068. They are particularly suitable for feeding a strongly variable load, for example a luminescent tube, with alternating current of comparatively high frequency. Owing to the fact that the operating frequency is substantially determined by the load circuit instead of by the time between the start of a period of conductivity and the start of a saturation phenomenon in the transformer and/or in the transistor, as is the case in most conventional transistor converters, the losses in the transformer and in the transistor may be kept small.

In order to obtain a satisfactory efficiency, it is necessary to limit not only the losses in the transformer, but also the losses in the transistors and the required excitation power. On the other hand, it is frequently desirable to operate the converter at a comparatively high operating frequency. The mechaniacl oscillations of the ferromagnetic transformer core thus become inaudible and, for certain loads, a comparatively high supply frequency is also favourable. This is particularly true in the case of luminescent tubes.

In order to minimise the losses in the transistors, the feed-back must be so designed that at the moment when the collector current of the conducting transistor passes through zero, the transistor is cut off and any second transistor connected in push-pull therewith is rendered conducting. It will be evident that such a condition can never be fulfilled for a converter whose operating frequency is determined or influenced by a saturation phenomenon. On the other other hand, abrupt blocking of a transistor requires sharp reverse-voltage pulses, the duration of which decrease, and the amplitude of which increase, as the operating frequency increases. More particularly, if this frequency is of the order of magnitude of the α' cut-off frequency of the transistors employed, the reverse-current pulses supplied to the base must be capable of restricting and/or reducing the delay and the smoothing of the edges of the collector current pulses brought about by storage of free charge carriers in the base zone. For this purpose it has been suggested in the above-noted patent to include an RC-element in the base-emitter circuit of each transistor of a push-pull converter, the capacitance of this element at the operating frequency of the converter having an impedance smaller than the value of its resistor. Using this step insures that the base current pulse of each transistor leads with respect to its collector current; due to accumulation of free charge carriers in its base zone, the collector current of each transistor subsists after blocking of the base-emitter path of the same transistor, and it is interrupted, prior to the inversion of the collector voltage of the transistor, by a reverse current pulse supplied to its base via the capacitor of the RC-element.

An object of the present invention is to provide another, particularly advantageous solution of the problem of the abrupt commutation of the transistors of a voltage converter of the type having an under-critically damped load circuit determining the operating frequency at the moment when the collector current passes through zero. A voltage converter according to the invention is characacterized by the inclusion at a non-linear network having a comparatively small operating range so that a sharp blocking pulse is fed back to the base of the transistor at the moment when the current in its emitter-collector circuit again becomes zero due to the oscillation in the load circuit.

The blocking pulse thus produced counteracts the feed-back through any output and/or feed-back transformer; in this sense, the circuit path through the non-linear network could be considered as a negative feed-back circuit. The positive feed-back then brings about the increase in current and the negative feed-back the sudden cutting off at the chosen moment. If more particularly the non-linear network includes a material having a hysteresis loop of a rectangular character, it is readily possible for the moment of production of the blocking pulse to be adjusted relative to the moment at which the current in the emitter-collector circuit of the transistor passes through zero; this can be done, for example, by polarising the material in a suitable manner.

According to one aspect of the invention, the non-linear network preferably comprises a feed-back transformer having a primary winding connected between the emitter or the collector of the transistor and the load circuit, a magnetic core which, during a considerable portion of each conductive operating period of the transistor, is saturated by the current traversing said winding, and a secondary winding which is coupled to the base circuit of the transistor.

In order that the invention may be readily carried into effect, it will now be described in detail, by way of example, with reference to the accompanying diagrammatic drawing, in which.

Figure 1:
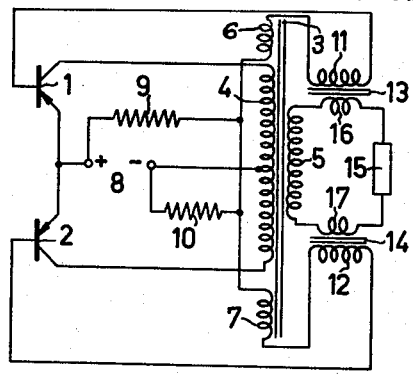
FIGURE 1 shows the circuit diagram of a first embodiment of the voltage converter according to the invention.

Referring now to FIGURE 1, this figure shows diagrammatically a first embodiment of the voltage converter according to the invention. This converter comprises two transistors 1 and 2 connected in push-pull, and a transformer 3 having a center-tapped primary winding 4. The center tap is connected to the negative terminal of a supply voltage source 8, the two ends of the winding 4 being connected to the collectors of the transistors 1 and 2 respectively. The emitters of the transistors 1 and 2 are connected directly to the positive terminal of the supply source 8, a voltage divider comprising resistors 9 and 10 being connected across this source. In addition, the transformer 3 comprises an output winding 5 and two feed-back windings 6 and 7 which bring about a crosswise regenerative feed-back between the collector and base circuits of the transistors 1 and 2. In addition to the windings 6 and 7 respectively, the base circuits of the transistors 1 and 2 include secondary windings 11 and 12, respectively, of small auxiliary transformers 13 and 14 respectively, which secondary windings are connected in series with the windings 6 and 7. The base circuit of each transistor closes via the series-connected windings 11, 6 and 12, 7 respectively, through the voltage-divider comprising the resistors 9 and 10. A load 15 is connected across the series-combination of the primary windings 16 and 17 of the auxiliary transformers 13, 14 and of the output winding 5 of transformer 3. This load constitutes, possibly together with any inductances of transformer 3 transformed and effective at the terminals of winding 5 and with any primary inductances of the transformers 13 and 14, an under-critically damped oscillatory circuit, which thus determines the operating frequency of the converter.

Figure 2:
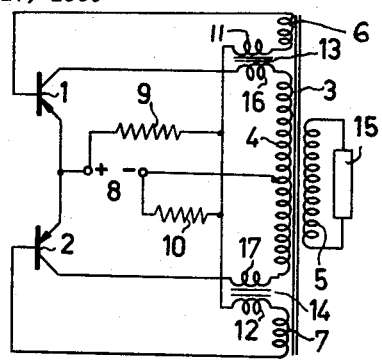
FIGURE 2 shows the circuit diagram of a second embodiment.

FIGURE 2 shows a second embodiment of the voltage converter according to the invention. This embodiment differs from that of FIGURE 1 only in that the primary windings 16 and 17 of the auxiliary transformers 13 and 14 are included in the collector circuits of the transistors 1 and 2 instead of, as in the embodiment of FIGURE 1, in the supply circuit for the load 15, between the latter and the output winding 5 of transformer 3. In addition, the secondary windings 11 and 12 of the same auxiliary transformers are connected between the voltage divider 9, 10 and the feed-back windings 6 and 7 respectively instead of, as in FIG. 1, between the windings 6 and 7, respectively, and the bases of the transistors 1 and 2 respectively.

Figure 3:
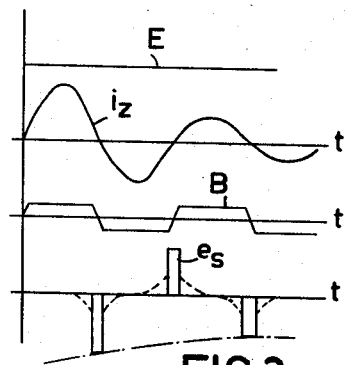
FIGURE 3 shows current-time and voltage-time diagrams provided to explain the operation of a converter according to the invention.

FIGURE 3 shows current-time and voltage-time diagrams provided for explaining the operation of the voltage converters of FIGS. 1 and 2. The upper line shows the application of the voltage E from the source 8 between the center tap of winding 4 and the emitters of the transistors 1 and 2. At the moment when this voltage E is applied, one of the transistors 1 and 2, due to the slightest asymmetry of the circuit arrangement or to an incoming interfering pulse, always has a higher conductivity than the other. Owing to the feedback coupling by means of the windings 4, 6 and 7 of transformer 3, the current in the emitter-collector circuit of the conducting transistor (for example of transistor 1) rapidly increases, whereas the current in the emitter-collector circuit of the other transistor 2 decreases equally rapidly. The linearly-increasing current through one half of the winding 4 induces a voltage in the circuit of the output winding 5 and of the load 15 and of the primary windings 16 and 17 of the auxiliary transformers 13 and 14 which may be connected in series therewith. This voltage causes excitation of the oscillatory circuits comprising the load 15 and any inductances present in the load circuit so that the current $i_z$ which traverses the load circuit acquires the shape shown on the second line of FIGURE 3; it can be seen that this is the shape of an oscillation damped comparatively strongly, but under-critically.

Figure 8:
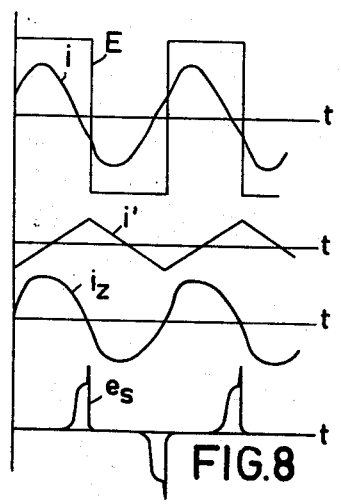
FIGURE 8 shows current-time and voltage-time diagrams provided to explain the influence of the load circuit upon the operation of the converter according to the invention.

Each of the auxiliary transformers 13 and 14 has a core composed of a ferromagnetic material having, for example, an approximately rectangular hysteresis loop; the length of the magnetic circuit and the number of turns of the primary windings 16 and 17 are selected so that the core is very rapidly saturated by the load current $i_z$ or the transformed load current in the collector circuit of the transistor 1 or 2. The primary winding (16 or 17) and the secondary winding (11 or 12) of each of the auxiliary transformers 13 and 14 are connected in such manner that the load current $i_z$ or the collector current $i_{c1}$ or $i_{c2}$ and the base current $i_{b1}$ or $i_{b2}$ cause magnetisation of the associated transformer core in opposite directions. However, the ampere turns through the primary windings 16 and 17 are highly predominant with respect to the ampere turns through the secondary windings 11 and 12. The third line of FIGURE 3 shows the variation of the magnetic saturation of the magnetic circuit of one of these transformers. As long as the core of one of the auxiliary transformers 13 and 14, for example that of transformer 13, is saturated and the magnetic inductance B in this core does not vary, no voltage is induced in the secondary winding 11 of this transformer by the load current $i_z$, only the feed-back coupling by means of the windings 6 and 7 of transformer 3 being active. This feed-back coupling brings about a steady further increase of the current in the collector circuit of one of the transistors, for example of transistor 1 and causes the current in the collector circuit of the other transistor to decrease or to remain zero. The transformer 3 is so proportioned, and the base current of each of the transistors 1 and 2 is so adjusted, that the current $i_{c1}$ or $i_{c2}$ cannot attain the saturation value, at least during the first half cycle of the load current $i_z$. At the moment when the oscillation current through the load 15 and hence also through the windings 16 and 17 again declines towards zero, the core of each of the transformers 13 and 14 is brought out of its saturation condition and a sharp pulse $e_s$ (last line of FIGURE 3) is induced in the winding 11 or 12 of this transformer. The pulse induced in the secondary winding 11 of auxiliary transformer 13 brings about, for example, an abrupt blocking of the transistor 1, whereas the pulse induced at the same time in the winding 12 brings about a forward current in the base-emitter circuit of the transistor 2 and is hence strongly damped by this circuit. The decrease of the base current $i_{b1}$ or $i_{b2}$ through the secondary winding 11 or 12 of the transformer 13 or 14 reduces somewhat the speed of the decrease of the magnetic inductance B in the core of this transformer, resulting in the voltage pulse at the secondary winding 11 or 12 being somewhat smoothed, however, this influence is negligible when the auxiliary transformers are suitably proportioned. The reverse voltage pulse is chosen to have a value such that the base current $i_{b1}$ or $i_{b2}$ is completely suppressed approximately at the moment when the load current $i_z$ passes through zero. Consequently, the magnetising current of transformer 3 cannot increase further, however small it be, and commutation of the transistors 1 and 2 takes place. A rectangular voltage as shown on the first line of FIGURE 8 is thus set up across the whole of the winding 4. Regardless of the form of the regenerative feed-back circuits, in the present example of the feed-back windings 6 and 7 and of the voltage-divider 9, 10, it is thus ensured that the transistors are switched over at the most suitable moment, i.e., at the moment when the total current $i_z$ is substantially zero. Apart from the fact that such switching-over always takes place before magnetic saturation of the core of the main transformer 3 sets in, so that the magnetic losses are greatly reduced, the losses in the transistors are considerably reduced due to the exact synchronisation between the switching over and the passages of the load current through zero. Due to the reduced losses in the transistors, it is again possible to deliver a larger power to the load 15 with given transistors. In view of the comparatively low admissible loss of energy in transistors hitherto known, the circuit according to the invention renders possible a whole series of new applications, for example feeding of electric motors or of luminescent tubes from a battery of low voltage and with alternating current of the desired frequency, for example with alternating current of a frequency higher than about 1000 c./s.

Figure 4:
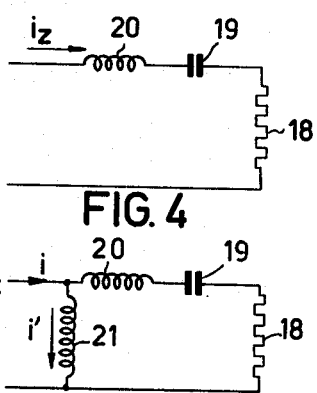
FIGURES 4, 5, 6 and 7 show a few examples of advantageous load circuits for such converters.

FIGURES 4 to 7 show several examples of load circuits which are under-critically damped and which determine the operating frequency of the self-excited transistor voltage converter. The load circuit shown in FIGURE 4 comprises an ohmic load 18 with which a capacitor 19 and an inductor 20 are connected in series. When disregarding the natural inductances of the transformer 3 and of the auxiliary transformers 13 and 14, as viewed from the terminals of the windings 5, 16 and 17, for example in the converter shown in FIGURE 1, the operating frequency of the converter loaded by this network becomes equal to the natural frequency of the load circuit 18, 19, 20 of FIGURE 4. If the ohmic part of the load (resistor 18) is an ordinary load resistor, optimum matching may be obtained with this simple load circuit. However, if the load resistor 18 is constituted by the discharge path of a luminescent tube or by another resistor having a value which decreases with increasing voltage within a certain range of voltages, it is necessary to connect a control impedance in the load circuit since the peak value of the voltage across the load circuit is always substantially equal to the voltage E delivered by the transformer 3. This control impedance must ensure the stability of the whole of the device at a permissible or desirable value of the current through resistor 18. At the operating frequency of the voltage converter, the impedance of the series-combination of the capacitor 19 and of the inductor 20 for the fundamental frequency is zero, apart from the small losses in these elements. The circuit shown in FIGURE 4 is thus not suitable for feeding a luminescent tube or a similar device having a resistance characteristic including a negative portion.

Figure 5:
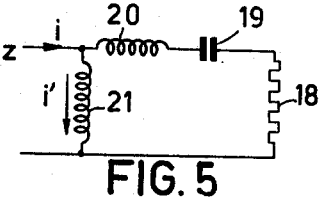

The load shown in FIGURE 5 comprises the same elements as the load of FIGURE 4 and, in addition, a parallel inductor 21. The operating frequency of the voltage converter is now determined by the capacitor 19 and the inductors 20 and 21, the load current $i_z$ being divided into an approximately sinusoidal current $i$ through the series-combination of the inductor 20, the capacitor 19 and the resistor 18 and a linearly-varying current $i'$ through the inductor 21, as shown on the first two lines of FIGURE 8. The linearly increasing or decreasing current $i'$ is produced by the transformed rectangular voltage E effective at the terminals of the output winding 5, as shown on the first line of FIGURE 8, and since the series-combination of the inductor 20 and of the capacitor 19 now has a natural frequency higher than that of the complete load circuit 15 of FIGURE 5, the current $i$ through the series-combination 18, 19, 20 somewhat leads with respect to the rectangular voltage E of the first line of FIGURE 8. However, the load current $i_z$ obtained by addition of the currents $i$ and $i'$ varies as shown on the third line of FIGURE 8 and always attains the value zero at the moment when the transistors 1 and 2 are switched over, i.e. at the moment when the voltage E jumps from a positive value to an equal negative value. However, the series-combination of the inductor 20 and of the capacitor 19 constitutes a definite, not negligible impedance for the current $i$ through resistor 18, so that these two elements, taken together, constitute a control impedance for regulating the current through resistor 18.

As can be seen from the third line of FIGURE 8, the total load current $i_z$ is no longer sinusoidal, but somewhat distorted. At the end of each half cycle, it approaches the value zero with a somewhat reduced slope and then increases again with slightly increased slope and with the inverse polarity. Consequently, the edges of the curve B of the third line of FIGURE 3 are no longer straight so that the blocking pulses $e_s$ are somewhat distorted, as shown on the last line of FIGURE 8. However, this is not of decisive importance for the operation of the voltage converter so long as the blocking pulses $e_s$ are supplied to the base of the transistor to be switched off at the moment when the load current $i_z$ passes through zero. If, as in FIGURE 2, the auxiliary transformers are included in the primary circuit of the main transformer, the inductor 21 of FIGURE 5 may be constituted by this transformer 3. By providing an air-gap in the core of this transformer, its magnetising current is brought to the value desired. A considerabl inductance, which takes the place of the separate inductor 21, then appears at the terminals of the output winding 5.

It would alternatively be possible to omit the inductor 20 in the load circuit of FIGURE 5. However, the slope of the variation in the current $i_z$ just before the passage through zero would then become much smaller. On the other hand, the operating frequency of the converter would strongly increase with the load, which is undesirable in most cases, while with the circuit shown in FIGURE 5 the operating frequency can at most increase up to the natural frequency of the series-oscillatory circuit 19, 20.

Figure 6:
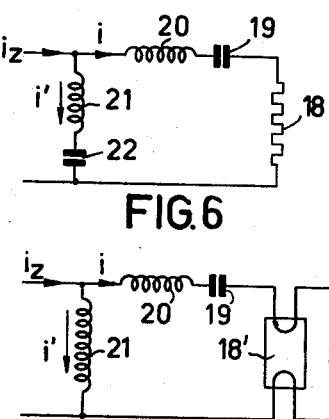

By introducing a second capacitor 22 in series with the inductor 21 of the load shown in FIGURE 5, one obtains, as shown in FIGURE 6, one more degree of freedom. It is thus possible to obtain a higher control impedance in series with resistor 18 and, at the same time, a better slope of the variation in the load current $i_z$ in the vicinity of its passages through zero. In this case, the inductor 21 cannot be constituted by the transformer 3. If desired, the capacitor 19 may be omitted, one degree of freedom then, of course, being lost.

Figure 7:
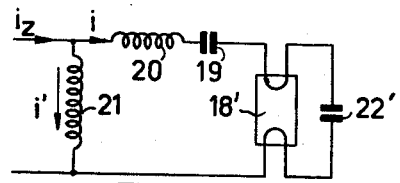

Finally, FIGURE 7 shows a load circuit in which the load resistor 18 is constituted by the discharge path of a luminescent tube 18' and which otherwise corresponds to the circuit diagram shown in FIGURE 5. For heating the cathodes of the luminescent tube 18', these cathodes are connected in the load circuit, in series with each other and with a capacitor 22', and in parallel with the discharge path of the luminescent tube. The use of capacitor 22' provides one more degree of freedom, which serves to adjust the heating current for the cathodes of the luminescent tube 18'.

While the invention has been described with respect to specific embodiments, many other modifications and variations are possible in the light of the above teachings without departing from the inventive concept, the scope of which is set forth in the appended claims.

What is claimed is:

1. A voltage converter including an oscillator having at least one transistor, a feedback circuit and a load circuit, said load circuit being an under-critically damped circuit coupled to the emitter-collector circuit of each transistor of said oscillator and determining the operating frequency of said oscillator, a saturable non-linear element associated with each transistor, first means for coupling said element to the emitter-collector circuit of the associated transistor and second means for coupling said element to the base electrode of the associated transistor, said element and said first means co-acting to produce saturation of said element at a relatively small value of the current in the emitter-collector circuit of the associated transistor, whereby said element flips over from a first saturation condition to a second saturation condition in response to zero current in the emitter-collector circuit of the associated transistor, said second means feeding back a sharp blocking pulse to the base electrode of the associated transistor in response to the flip-over of the non-linear element.

2. A converter as claimed in claim 1, wherein each non-linear element and said first and second coupling means comprise a feedback transformer having a primary winding arranged between the emitter-collector circuit of the associated transistor and said load circuit, a magnetic core constituting the non-linear element which is saturated during the greatest portion of each conductive operating period of the associated transistor by current traversing said primary winding, and a secondary winding connected to the base electrode of the associated transistor.

3. A converter as claimed in claim 2, the core of each transformer being saturated by a current which is a small fraction of the amplitude of the current traversing its primary winding, whereby said blocking pulse is produced substantially at the time when the instantaneous value of the emitter-collector current of the associated transistor traverses zero amplitude.

4. A voltage converter including an oscillator having two transistors connected in push-pull and alternately conducting, an output transformer having two symmetrical primary winding portions coupled to the emitter-collector circuits of the transistors, a secondary winding coupled to a load constituting an undercritically damped circuit and determining the operating frequency of the oscillator, and feedback windings coupled to the base circuits of said transistors, and two non-linear networks each being coupled to the emitter-collector circuit of an associated transistor and to its base electrode, each non-linear network comprising a feedback transformer having a magnetic core and primary and secondary windings, the secondary winding of each feedback transformer being connected in the base circuit of the associated transistor in series with a feedback winding of the output transformer, the primary winding of each feedback transformer being connected in the emitter-collector circuit of the associated transistor in series with a corresponding portion of the primary winding of the output transformer, each of said feedback transformer magnetic cores being saturated by a current equal to a small fraction of the amplitude of the current traversing its primary winding, each feedback transformer operating in response to zero current in the emitter-collector circuit of its associated transistor to feed back a sharp blocking pulse to said transistor.

5. A voltage converter including: an oscillator having at least one transistor, a feedback circuit and a load circuit for said transistor, said load circuit being an under-critically damped circuit coupled to the emitter-collector circuit of each transistor of said oscillator by an output transformer having at least one feedback winding, said load circuit determining the operating frequency of said oscillator, a non-linear network associated with each transistor, each non-linear network comprising a feedback transformer having a primary winding arranged between the load circuit and the emitter-collector circuit of the associated transistor, a magnetic core which is saturated during the greatest portion of each conductive operating period of the associated transistor by current traversing said primary winding, and a secondary winding connected to the base electrode of the associated transistor in series with a feedback winding of said output transformer, said non-linear network operating in response to zero current in the emitter-collector circuit of one transistor to feed back a sharp blocking pulse to the base electrode of said one transistor.

6. A voltage converter including: an oscillator having at least one transistor, a feedback circuit and a load circuit for said transistor, said load circuit being an under-critically damped circuit coupled to the emitter-collector circuit of each transistor of said oscillator by an output transformer having at least one feedback winding, said load circuit determining the operating frequency of said oscillator, a non-linear network associated with each transistor, each non-linear network comprising a feedback transformer having a primary winding arranged between the load circuit and the emitter-collector circuit of the associated transistor, a magnetic core which is saturated during the greatest portion of each conductive operating period of the associated transistor by current traversing said primary winding, said core being saturated by a current having an amplitude which is a small fraction of the amplitude of the current traversing its primary winding, and a secondary winding connected to the base electrode of the associated transistor in series with a feedback winding of said output transformer, said non-linear network operating in response to zero current in the emitter-collector circuit of one transistor to feed back a sharp blocking pulse to the base electrode of said one transistor, said blocking pulse being produced substantially at the time when the instantaneous value of the emitter-collector current of the associated transistor traverses zero amplitude.

7. A voltage converter including: an oscillator having at least one transistor, a feedback circuit and a load circuit for said transistor, said load circuit being an under-critically damped circuit coupled to the emitter-collector circuit of each transistor of said oscillator by an output transformer having at least one feedback winding, said load circuit determining the operating frequency of said oscillator, a non-linear network associated with each transistor, each non-linear network comprising a feedback transformer having a primary winding connected in the emitter-collector circuit of the associated transistor in series with a portion of the primary winding of the output transformer, a magnetic core which is saturated during the greatest portion of each conductive operating period of the associated transistor by current traversing said primary winding, and a secondary winding coupled to the base electrode of the associated transistor, said non-linear network operating in response to zero current in the emitter-collector circuit of one transistor to feed back a sharp blocking pulse to the base electrode of said one transistor.

8. A voltage converter including: an oscillator having at least one transistor, a feedback circuit and a load circuit for said transistor, said load circuit being an under-critically damped circuit coupled to the emitter-collector circuit of each transistor of said oscillator by an output transformer having at least one feedback winding, said load circuit determining the operating frequency of said oscillator, a non-linear network associated with each transistor, each non-linear network comprising a feedback transformer having a primary winding connected in the emitter-collector circuit of the associated transistor in series with a portion of the primary winding of the output transformer, a magentic core which is saturated during the greatest portion of each conductive operating period of the associated transistor by current traversing said primary winding, and a secondary winding connected to the base electrode of the associated transistor in series with a feedback winding of said output transformer, said non-linear network operating in response to zero current in the emitter-collector circuit of one transistor to feed back a sharp blocking pulse to the base electrode of said one transistor.

9. A voltage converter including: an oscillator having at least one transistor, a feedback circuit and a load circuit for said transistor, said load circuit being an under-critically damped circuit coupled to the emitter-collector circuit of each transistor of said oscillator by an output transformer having at least one feedback winding, said load circuit determining the operating frequency of said oscillator, a non-linear network associated with each transistor, each non-linear network comprising a feedback transformer having a primary winding connected in the emitter-collector circuit of the associated transistor in series with a portion of the primary winding of the output transformer, a magnetic core which is saturated during the greatest portion of each conductive operating period of the associated transistor by current traversing said primary winding, said core being saturated by a current having an amplitude which is a small fraction of the amplitude of the current transversing its primary winding, and a secondary winding connnected to the base electrode of the associated transistor in series with a feedback winding of said output transformer, said non-linear network operating in response to zero current in the emitter-collector circuit of one transistor to feed back a sharp blocking pulse to the base electrode of said one transistor, said blocking pulse being produced substantially at the time when the instantaneous value of the emitter-collector current of the associated transistor traverses zero amplitude.

References Cited in the file of this patent

UNITED STATES PATENTS

| | | |
|---|---|---|
| 2,774,878 | Jensen | Dec. 18, 1956 |
| 2,915,710 | Schiewe et al. | Dec. 1, 1959 |
| 2,928,994 | Widakowich | Mar. 15, 1960 |
| 2,968,738 | Pintell | Jan. 17, 1961 |
| 3,008,068 | Wilting et al. | Nov. 7, 1961 |